US012418630B2

(12) United States Patent
Farmer et al.

(10) Patent No.: US 12,418,630 B2
(45) Date of Patent: Sep. 16, 2025

(54) LOBBY CHAT WITH EXTERNAL ANONYMOUS GUESTS

(71) Applicant: Microsoft Technology Licensing, LLC, Redmond, WA (US)

(72) Inventors: Hayley Christine Farmer, Lowell, IN (US); Cassandra Nichole Jackson, Houston, TX (US); Andres Mauricio Santamaria Borda, Seattle, WA (US); Shyama Prasad Hembram, Bothell, WA (US); Ai He, Sammamish, WA (US); Johnson J. Lee, Seattle, WA (US); Sonal Aggarwal, Dallas, TX (US); James Patrick Frisby, Dallas, TX (US); Christopher Jordan Bohlin, Arlington, TX (US); Karthik Venkataramana Pemmaraju, Irving, TX (US); Wenjing Liu, Brooklyn, NY (US); Feven Debela, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 104 days.

(21) Appl. No.: 18/098,569

(22) Filed: Jan. 18, 2023

(65) Prior Publication Data

US 2024/0244162 A1 Jul. 18, 2024

(51) Int. Cl.
*H04N 7/15* (2006.01)
*H04L 51/046* (2022.01)

(52) U.S. Cl.
CPC ........... *H04N 7/157* (2013.01); *H04L 51/046* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 10,805,101 B1 | 10/2020 | Wang et al. | |
| 12,081,602 B1* | 9/2024 | Gudipati | H04L 65/611 |
| 2008/0256182 A1 | 10/2008 | Sekaran et al. | |
| 2010/0325561 A1* | 12/2010 | Archambault | H04L 12/1818 |
| | | | 715/753 |

(Continued)

OTHER PUBLICATIONS

Price, et al., "Throttling Pattern", Retrieved From: https://learn.microsoft.com/en-us/azure/architecture/patterns/throttling, Jul. 28, 2022, 7 Pages.

(Continued)

*Primary Examiner* — Duc Nguyen
*Assistant Examiner* — Assad Mohammed
(74) *Attorney, Agent, or Firm* — NovoTechIP International PLLC

(57) ABSTRACT

Systems and techniques for lobby chat with external anonymous guests are described. The described systems and techniques allow for two-way chat functionality while attendees of a virtual meeting are in a virtual lobby. A virtual lobby is a gateway to a virtual meeting where participants wait for admittance to the virtual meeting. "Lobby chat" refers to a chat within a virtual lobby of a virtual meeting. Advantageously, through the lobby chat, attendees within the virtual lobby can communicate prior to being admitted to the virtual meeting.

20 Claims, 9 Drawing Sheets

(56) References Cited

U.S. PATENT DOCUMENTS

2021/0136013 A1* 5/2021 Evgey .................... G06Q 50/01
2022/0286645 A1 9/2022 John

OTHER PUBLICATIONS

Price, et al., "Retry Pattern", Retrieved From: https://learn.microsoft.com/en-us/azure/architecture/patterns/retry, Jul. 28, 2022, 8 Pages.

Price, et al., "Circuit Breaker Pattern", Retrieved From: https://learn.microsoft.com/en-us/azure/architecture/patterns/circuit-breaker, Jul. 28, 2022, 12 Pages.

Price, et al., "Cache-Aside Pattern", Retrieved From: https://learn.microsoft.com/en-us/azure/architecture/patterns/cache-aside, Nov. 11, 2022, 7 Pages.

Price, et al., "Bulkhead Pattern", Retrieved From: https://learn.microsoft.com/en-us/azure/architecture/patterns/bulkhead, Nov. 11, 2022, 5 Pages.

Au, et al., "Azure Front Door and CDN Documentation", Retrieved From: https://learn.microsoft.com/en-us/azure/frontdoor/, Sep. 15, 2022, 4 pages.

Bell, et al., "What is Azure DDOS Protection?", Retrieved From: https://learn.microsoft.com/en-us/azure/ddos-protection/ddos-protection-overview, Nov. 15, 2022, 4 Pages.

Mkhribech, et al., "OnlineMeeting: createOrGet", Retrieved From: https://learn.microsoft.com/en-us/graph/api/onlinemeeting-createorget?view=graph-rest-beta&tabs=http, Jul. 20, 2022, 7 Pages.

Mumbi, et al., "Pagination", Retrieved From: https://learn.microsoft.com/en-us/odata/client/pagination#client-driven-paging, Jan. 29, 2021, 5 Pages.

Palmer, et al., "Quickstart: Add Chat to your App", Retrieved From: https://learn.microsoft.com/en-us/azure/communication-services/quickstarts/chat/get-started?pivots=programming-language-javascript&tabs=windows, Sep. 2, 2022, 12 Pages.

Plumley, et al., "Restore a deleted Microsoft 365 group", Retrieved From: https://learn.microsoft.com/en-us/microsoft-365/admin/create-groups/restore-deleted-group?view-o365-worldwide&tabs=admin-center#restore-a-group, Oct. 27, 2022, 2 Pages.

Zoom Support "Using event lobby chat" Dec. 5, 2022, Retrieved on: Jan. 18, 2023, 3 pages, Retrieved from: https://support.zoom.us/hc/en-us/articles/6739812387853-Using-event-lobby-chat.

Zoom Support "Using Waiting Room" Dec. 20, 2022, Retrieved on: Jan. 18, 2023, 5 pages, Retrieved from: https://support.zoom.us/hc/en-us/articles/115000332726-Using-Waiting-Room.

Zoom Support "Using private lobby chats" Nov. 4, 2022, Retrieved on: Jan. 18, 2023, 2 pages, Retrieved from: https://support.zoom.us/hc/en-us/articles/8628066772621-Using-private-lobby-chats.

Zoom Support "Allowing hosts to enable chat in Zoom Event's lobby" Dec. 29, 2022, Retrieved on: Jan. 18, 2023, 2 pages, Retrieved from: https://support.zoom.us/hc/en-us/articles/8695907834637-Allowing-hosts-to-enable-chat-in-the-Zoom-Events-lobby.

International Search Report and Written Opinion received for PCT Application No. PCT/US2023/086126, Apr. 3, 2024, 13 pages.

International Preliminary Report on Patentability Received for PCT Application No. PCT/US2023/086126, mailed on Jul. 31, 2025, 09 pages.

\* cited by examiner

LOBBY CHAT WITH EXTERNAL ANONYMOUS GUESTS

BACKGROUND

A virtual meeting enables people in different physical locations to use their mobile or internet connected devices to see and hear each other simultaneously. In these virtual meetings, video provides the benefit of being able to see the expressions and reactions of other people in addition to being able to hear what they're saying. Virtual meetings are also commonly referred to as online meetings, virtual appointments, video meetings, video conferences, and web conferences.

People use virtual meetings in many ways, including for connecting with family and friends, financial consultations, healthcare visits, interviews, customer support, virtual fittings and consultations, education office hours, and collaborating with their distributed workforce. As an example, healthcare organizations can use virtual meetings for secure and efficient virtual visits between patients and providers for therapy sessions, medical services, and more. As another example, in the financial services sector, virtual meetings offer transformative ways to conduct financial consultations, insurance policy support, and loan advisory management. Employees can establish trusted connections with clients—without requiring them to meet in person and offer them the flexibility of self-serve scheduling. In yet another example, in the retail sector, virtual meetings allow sales associates to connect and build relationships with customers for virtual product showcasing, high-value retail consultations and customer service requests. In yet another example, for human resources departments using virtual meetings, companies can broaden their hiring scopes through remote interviews—and create more convenient and seamless interview experiences for job applicants.

BRIEF SUMMARY

Systems and techniques for lobby chat with external anonymous guests are described. The described systems and techniques allow for two-way chat functionality while attendees of a virtual meeting are in a virtual lobby. A virtual lobby is a gateway to a virtual meeting where participants wait for admittance to the virtual meeting. "Lobby chat" refers to a chat within a virtual lobby of a virtual meeting. Advantageously, through the lobby chat, attendees within the virtual lobby can communicate prior to being admitted to the virtual meeting.

In one aspect, a computer-implemented method for providing lobby chat with external anonymous guests includes, in response to receiving an indication of a virtual meeting being launched by an anonymous guest, generating a lobby chat identity for the anonymous guest, wherein the virtual meeting has corresponding virtual meeting information. The computer-implemented method also includes in response to receiving an indication the anonymous guest joined a lobby of the virtual meeting obtaining a communication service chat identifier for a lobby chat corresponding to the virtual meeting information, the lobby chat providing two-way chat functionality while any attendees of the virtual meeting are in the lobby; and adding the anonymous guest to a chat roster for the lobby chat using the guest lobby chat identity for the anonymous guest and the communication service chat identifier. The computer-implemented method also includes receiving, from an application of an internal user, a request to join a lobby chat with the anonymous guest associated with the virtual meeting information, the request to join the lobby chat comprising a lobby chat identity for the internal user; and in response to receiving the request to join the lobby chat, adding the internal user the lobby chat by: obtaining the communication service chat identifier for the lobby chat corresponding to the virtual meeting information; adding the internal user to the chat roster for the lobby chat using the lobby chat identity for the internal user and the communication service chat identifier; and providing the communication service chat identifier to the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
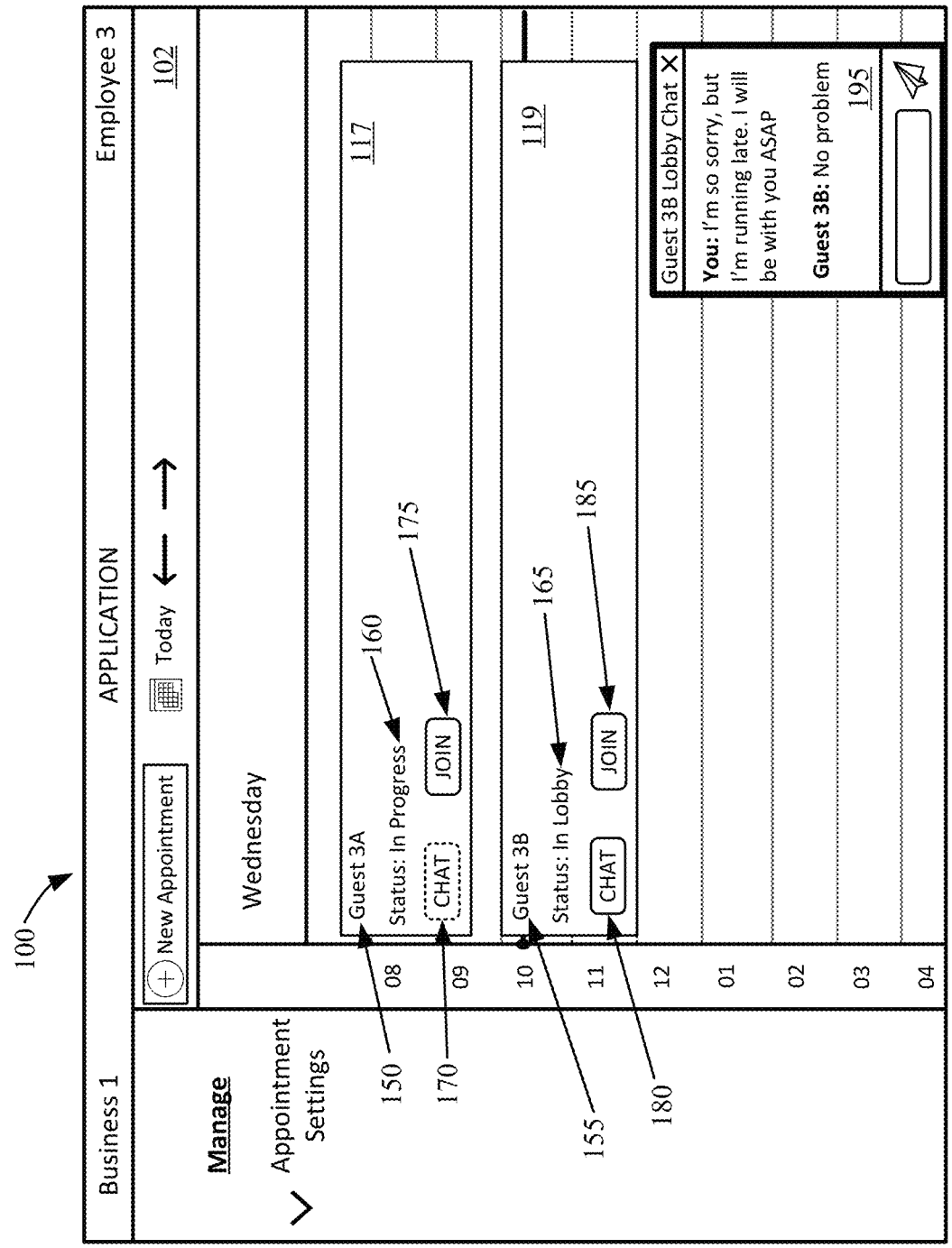
FIG. 1A illustrates an example lobby chat experience for an internal attendee of a virtual appointment according to an embodiment of the invention.

Systems and techniques for lobby chat with external anonymous guests are described. The described systems and techniques allow for two-way chat functionality while attendees of a virtual meeting are in a virtual lobby. A virtual lobby is a gateway to a virtual meeting where participants wait for admittance to the virtual meeting. "Lobby chat" refers to a chat within a virtual lobby of a virtual meeting. Advantageously, through the lobby chat, attendees within the virtual lobby can communicate prior to being admitted to the virtual meeting.

A virtual meeting enables people in different physical locations to use their mobile or internet connected devices to see and hear each other simultaneously. In these virtual meetings, video provides the benefit of being able to see the expressions and reactions of other people in addition to being able to hear what they're saying. The terms "virtual meeting", "online meeting", "virtual appointment", "virtual visit", "video meeting", "video conference", and "web conference" are used interchangeably herein.

People use virtual meetings in many ways, including for connecting with family and friends, financial consultations, healthcare visits, interviews, customer support, virtual fittings and consultations, education office hours, and collaborating with their distributed workforce.

Each virtual appointment includes a virtual meeting link that can be sent to an attendee, for example via email, where the attendee can easily join from a web browser or in the virtual meeting application on any device.

Attendees, or participants, of a virtual meeting can open and attend the virtual meeting in different ways. For example, if the attendee has previously downloaded the virtual meeting application, the virtual meeting can open in the application. However, it can be easy for an attendee to join a virtual meeting without having to download the virtual meeting application. For a more seamless experience, attendees can join virtual meetings, such as healthcare visits and financial consultations, from a desktop or mobile browser through a web browser join ("WBJ"). A WBJ provides an application-less virtual meeting joining experience in a web browser.

Attendees of a virtual meeting can be internal attendees or external attendees. An internal attendee is a user who has an account with an organization associated with the virtual meeting application. An external attendee, or guest, is an anonymous user who does not have an account with the organization associated with the virtual meeting application (e.g., meeting participants who are from another non-federated tenant or anonymous users who are not managed by the organization). A tenant refers to one or more users who share common access with specific privileges to a software instance. For example, a tenant can be a subscriber or customer of an application, such as an organization. Anyone who is not part of the organization can be added as guest in the virtual meeting application. For example, guests may include partners, vendors, suppliers, or consultants of the organization. Guests can have similar capabilities to internal attendees and can participate in meetings, chats, and work on documents.

Virtual meetings include a virtual meeting chat where meeting participants can share info without disrupting the flow of the meeting. A "virtual meeting chat" refers to a chat within a virtual meeting itself. Virtual meeting chat conversations within a virtual meeting happen within virtual meeting chat threads. A chat thread refers to a collection of all the messages sent during a chat. Each chat thread is uniquely identified by a thread identifier and each chat thread can have multiple users as participants who can send messages to the thread. These participants are part of a chat roster for the chat. Only participants on the chat roster can send or receive messages, add participants, or remove participants. The participants are added to the virtual meeting chat roster once they are admitted to the virtual meeting.

When an attendee joins a virtual meeting, the attendee may be placed in a virtual lobby, or virtual waiting room, prior to being admitted to the virtual meeting. A virtual lobby is a gateway to a virtual meeting where participants wait for admittance to the virtual meeting. The waiting room experience is an interim step before joining into the actual virtual meeting. The meeting lobby allows meeting organizers to vet an attendee before allowing them into the virtual meeting. The attendee may stay in the lobby until the virtual meeting begins or the organizer admits them into the meeting. When an attendee is waiting in the lobby of the virtual meeting, the attendee is not admitted to the virtual meeting, and thus, not yet part of the chat roster for the virtual meeting. The terms "meeting lobby", "lobby", "virtual lobby", "virtual waiting room", and "waiting room" are used interchangeably herein.

Typically, before an attendee is admitted into the virtual meeting, the attendee is not allowed to either send/receive messages through the virtual meeting chat to/from other participants who are already admitted to the virtual meeting since the attendee is not part of the virtual meeting chat roster. Thus, there is currently no way for the attendee to communicate with other participants while the attendee is in the lobby before the virtual meeting starts. As a result, attendees joining a virtual meeting must wait without any indicators of when the service provider will arrive, or the meeting will begin. Indeed, there is no way to provide the attendee waiting in the lobby with any contextual information for the virtual meeting using current existing technologies.

Advantageously, the described lobby chat provides two-way chat functionality while attendees of a virtual meeting are in the lobby. Indeed, lobby chat allows attendees, including external anonymous guests, to communicate with other participants in the virtual lobby even before the attendees have been admitted into the virtual meeting.

As an illustrative example, when a provider in a health care setting is running late between their multiple telehealth appointments and the patient is waiting in the virtual lobby, the patient does not have any context to when the provider's going to be joining. As a result, the patient may wonder if they are in the correct location, further hiking anxieties prior to meeting with their providers. Advantageously, lobby chat provides the functionality to allow the provider or another person on the care team to send a message to that patient waiting in the lobby to let them know that the provider will be there soon via a message directed through the lobby chat. For example, providers can send notifications to patients, e.g. "Last appointment is running long. Be with you in 5 mins". Additionally, patients can reply to an identity verification request from providers, e.g. "Please verify your first and last name" through lobby chat.

The virtual meeting chat and the described lobby chat are two distinct chats that do not interface with each other. Once an attendee is admitted to the virtual meeting from the virtual lobby, the attendee is transferred from the lobby chat to the virtual meeting chat.

Figure 1B:
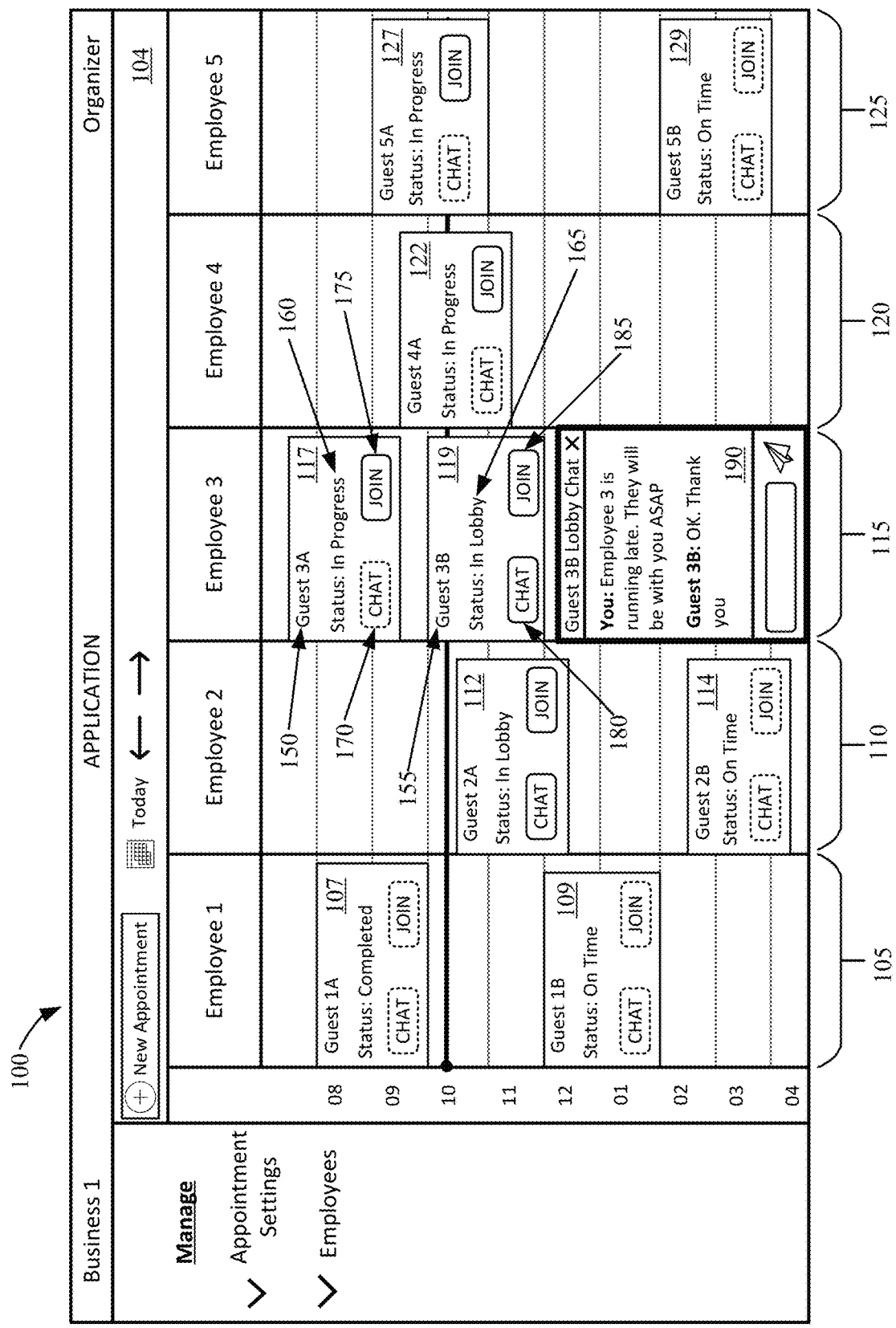
FIG. 1B illustrates an example lobby chat experience for an organizer of a virtual appointment according to an embodiment of the invention.

FIG. 1A illustrates an example lobby chat experience for an internal attendee of a virtual appointment according to an embodiment of the invention; and FIG. 1B illustrates an example lobby chat experience for an organizer of a virtual appointment according to an embodiment of the invention.

Organizations can allow employees to schedule and manage virtual appointments with attendees. For example, a healthcare organization can allow team members to schedule and manage telehealth appointments with patients and other healthcare providers. Schedulers, or organizers, within the organization can manage multiple department and staff calendars, as well as communications with internal and external attendees.

Referring to FIG. 1A and FIG. 1B, a user associated with an organization, such as an employee or an organizer of a virtual appointment, may open an application 100 on their computing device. The computing device can be, but is not limited to, a personal computer (e.g., desktop computer), a laptop computer, personal digital assistant (PDA), video game device, mobile phone (or smart phone), tablet, slate, terminal, holographic-enabled device, and the like.

Through a user interface (e.g., internal attendee user interface 102 or organizer user interface 104) of application 100 (an appointment scheduling application), the user can schedule and manage new and existing virtual appointments for an organization (e.g., Business 1). For example, through the organizer user interface 104, the organizer can schedule and manage new and existing virtual appointments for one or more employees (e.g., Employee 1, Employee 2, Employee 3, Employee 4, and Employee 5), as well as communications with internal and external attendees. The virtual appointments may be scheduled with other internal attendees or external attendees. An internal attendee is a user who has an account with the business and an external attendee, or guest, is an anonymous user who does not have an account with the business.

In the illustrative example of FIG. 1A, virtual appointments scheduled for the current day are shown in a calendar view for Employee 3 in the internal attendee user interface 102. Here, the calendar view for Employee 3 shows two virtual appointments (e.g., virtual appointment 117 from 7:30 AM to 9:30 AM and virtual appointment 119 from 10:00 AM to 12:00 PM) scheduled for Employee 3.

In the illustrative example of FIG. 1B, to help the organizer manage multiple department and staff calendars, the virtual appointments scheduled for the current day are shown in a calendar section for each employee (e.g., Employee 1 calendar section 105, Employee 2 calendar section 110, Employee 3 calendar section 115, Employee 4 calendar section 120, and Employee 5 calendar section 125). Here, Employee 1 calendar section 105 shows two virtual appointments (e.g., virtual appointment 107 from 8:00 AM to 10:00 AM and virtual appointment 109 from 12:00 PM to 2:00 PM) scheduled for Employee 1; Employee 2 calendar section 110 shows two virtual appointments (e.g., virtual appointment 112 from 10:30 AM to 12:30 PM and virtual appointment 114 from 2:30 PM to 4:30 PM) scheduled for Employee 2; Employee 3 calendar section 115 shows two virtual appointments (e.g., virtual appointment 117 from 7:30 AM to 9:30 AM and virtual appointment 119 from 10:00 AM to 12:00 PM) scheduled for Employee 3; Employee 4 calendar section 120 shows one virtual appointment (e.g., virtual appointment 122 from 9:30 AM to 11:30 AM) scheduled for Employee 4; and Employee 5 calendar section 125 shows two virtual appointments (e.g., virtual appointment 127 from 9:00 AM to 11:00 AM and virtual appointment 129 from 2:00 PM to 4:00 PM) scheduled for Employee 5.

The users (e.g., Employee 3 and the organizer) can view and manage information for each virtual appointment, such as attendee information (e.g., attendee information 150 for virtual appointment 117 and attendee information 155 for virtual appointment 119) and appointment status (e.g., status 160 for virtual appointment 117 and status 165 for virtual appointment 119).

In the illustrative examples of FIG. 1A and FIG. 1B, the attendee information 150 for virtual appointment 117 is the attendee's name "Guest 3A" and the status 160 is "In Progress" and the attendee information 155 for virtual appointment 119 is the attendee's name "Guest 3B" and the status 165 is "In Lobby". That is, Employee 3 is currently conducting the virtual appointment 117 with Guest 3A and Guest 3B is currently in the lobby waiting for Employee 3 to begin the scheduled virtual appointment 119. In this example, Guest 3A and Guest 3B are both external attendees (e.g., external anonymous guests).

Conventionally, neither Employee 3 nor the organizer (internal attendees) have the ability to send or receive chat messages to or from an attendee not admitted to a virtual appointment. Since Guest 3B is currently in the lobby of the virtual appointment 119, Guest 3B is not admitted to, and thus, not yet part of the chat roster for the virtual appointment 119. Thus, conventionally, neither Employee 3 nor the organizer have the ability to send or receive chat messages to or from Guest 3B while Guest 3B is in the lobby. Advantageously, through the described lobby chat, Employee 3 and the organizer are provided with two-way chat functionality with Guest 3B without Guest 3B leaving the lobby.

The virtual appointments can include a lobby chat icon and a join icon. The lobby chat icon allows the organizer to access the lobby chat functionality to initiate a lobby chat and chat with attendees waiting in the virtual appointment lobby and the join icon allows the organizer to join the virtual appointment.

The lobby chat icon and the join icon may not always be available to select. In some cases, the lobby chat icon is only selectable when the attendee is waiting in the virtual appointment lobby (e.g., when the status is "In Lobby") and the lobby chat functionality is available. Once the meeting starts or is completed (e.g., when the status is "In Progress" or "Completed"), the lobby chat functionality is no longer available, and the lobby chat icon is no longer selectable. In some cases, the join icon becomes selectable when the meeting has started or an attendee is in the lobby (e.g., when the status is "In Progress" or "In Lobby").

In the illustrative examples of FIG. 1A and FIG. 1B, since the status 160 of the virtual appointment 117 is "In Progress", the lobby chat icon for virtual appointment 117 (e.g., lobby chat icon 170) is not selectable. However, the join icon (e.g., join icon 175) is selectable virtual appointment 117. The lobby chat icon (e.g., lobby chat icon 180) and the join icon (e.g., join icon 185) for virtual appointment 119 are both selectable since the status 165 of the virtual appointment 119 is "In Lobby".

Since the lobby chat icon 180 is available for virtual appointment 119, Employee 3 or the organizer can select the lobby chat icon 180 to initiate a lobby chat with Guest 3B. For example, when the organizer determines Employee 3's virtual meeting with Guest 3A (virtual appointment 117) is running longer than expected, the organizer can select the lobby chat icon 180 for virtual appointment 119 to initiate a lobby chat with Guest 3B and send a message into the meeting lobby to let Guest 3B know Employee 3 will be late.

When a user (e.g., Employee 3 or the organizer) initiates the lobby chat with Guest 3B, a lobby chat user interface (UI) is presented to allow the user to exchange chat messages with an attendee in the lobby, such as an external anonymous guest.

In the illustrative example of FIG. 1A, Employee 3 selected lobby chat icon 180 and lobby chat UI 195 is presented. Through the lobby chat UI, Employee 3 can send and receive chat messages from Guest 3B. The message sent from Employee 3 to Guest 3B via the lobby chat UI 195 includes "I'm so sorry, but I'm running late. I will be with you ASAP" and the message received by Employee 3 from Guest 3B via the lobby chat UI 195 includes "No problem".

In the illustrative example of FIG. 1B, the organizer selected lobby chat icon 180 and lobby chat UI 190 is presented. Through the lobby chat UI, the organizer can send and receive chat messages from Guest 3B. The message sent from the organizer to Guest 3B via the lobby chat UI 190 includes "Employee 3 is running late. They will be with you ASAP" and the message received by the organizer from Guest 3B via the lobby chat UI 190 includes "OK. Thank you".

Advantageously, a lobby chat can be accessed through an application separate from a virtual meeting application. As can be seen in FIGS. 1A and 1B, the lobby chat UI (e.g., lobby chat UI 190 and lobby chat UI 195) exists on the appointment scheduling application (application 100)—the lobby chat UI is not accessed via the virtual meeting screen of a virtual meeting application.

Figure 2:
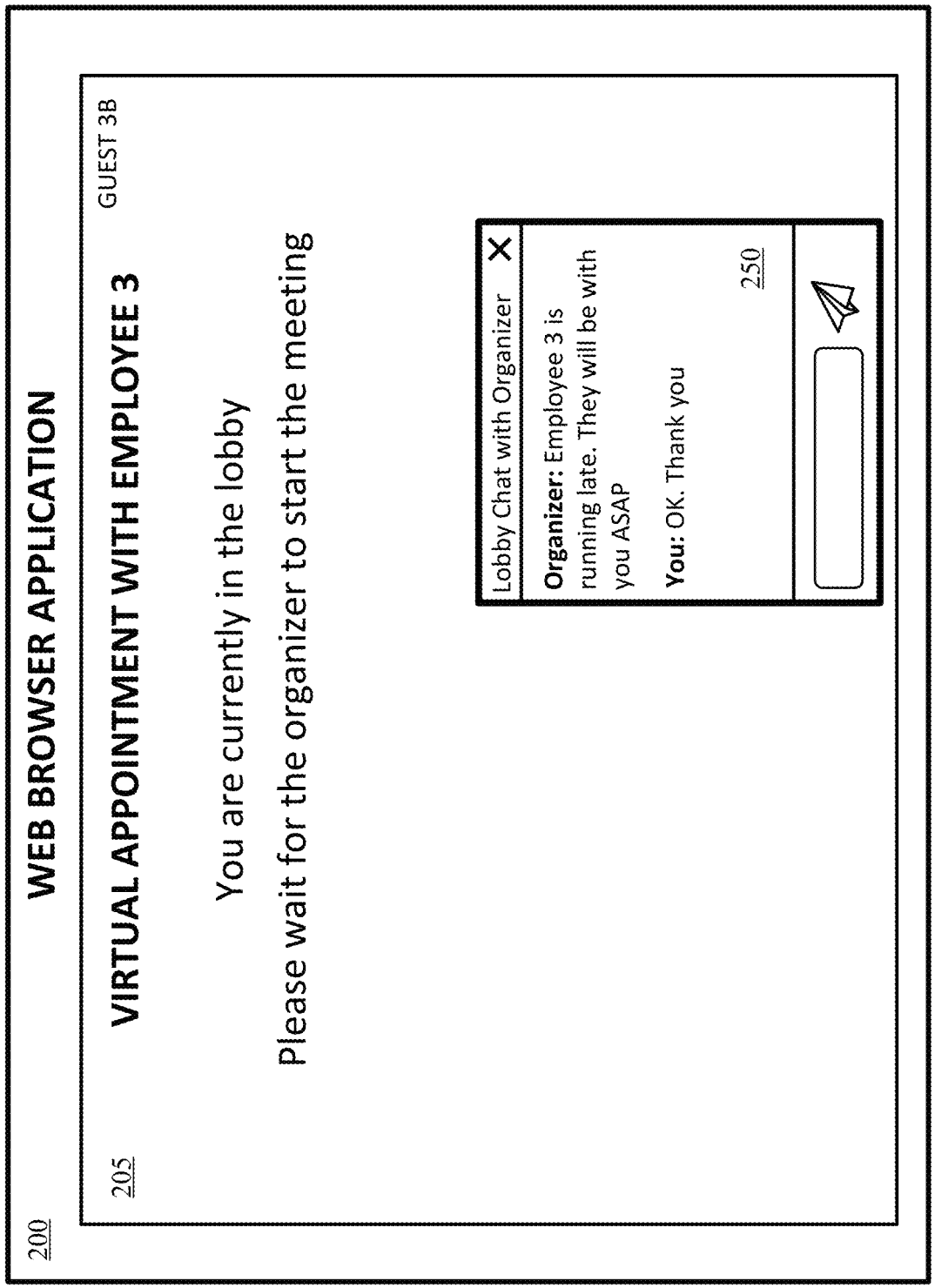
FIG. 2 illustrates an example lobby chat experience for an external anonymous guest according to an embodiment of the invention.

FIG. 2 illustrates an example lobby chat experience for an external anonymous guest according to an embodiment of the invention. Referring to FIG. 2, an external anonymous guest may open a web browser application 200 on their computing device. The computing device can be, but is not limited to, a personal computer (e.g., desktop computer), a laptop computer, personal digital assistant (PDA), video game device, mobile phone (or smart phone), tablet, slate, terminal, holographic-enabled device, and the like.

Through a virtual appointment UI 205 displayed within the web browser application 200, the guest can join a virtual appointment (e.g., virtual appointment 119 described with respect to FIG. 1A and FIG. 1B) without having to download a virtual appointment application.

When the guest joins the virtual appointment, the guest may be placed in a virtual lobby. As previously described, the virtual lobby allows organizers to vet attendees before allowing them into the virtual appointment.

In the illustrative example of FIG. 2, the guest, "Guest 3B", joins a virtual appointment scheduled with Employee 3 (e.g., virtual appointment 119 described with respect to FIG. 1A and FIG. 1B) and is placed in the virtual lobby. When in the virtual lobby, the virtual appointment UI 205 displays a message letting the guest know they must wait for the meeting to start. Here, the message states, "You are currently in the lobby" and "Please wait for the organizer to start the meeting".

As previously described in FIG. 1B, Employee 3 was not ready to join the virtual appointment with Guest 3B yet, so the organizer sent Guest 3B a message via the lobby chat UI 190 of FIG. 1B. When a lobby chat is initiated with an attendee waiting in the lobby of the virtual appointment and sends a message to the attendee, a lobby chat UI is presented to the attendee. The attendee can then send and receive messages from the organizer without leaving the lobby.

In the illustrative example of FIG. 2, when the organizer initiated a lobby chat with Guest 3B, as described in FIG. 1B, lobby chat UI 250 is presented within virtual appointment UI 205. The message sent from the organizer to Guest 3B ("Employee 3 is running late. They will be with you ASAP") is displayed within the lobby chat UI 250. Guest 3B can respond to the message from the organizer through the lobby chat UI 250 without leaving the virtual lobby.

Figure 3:
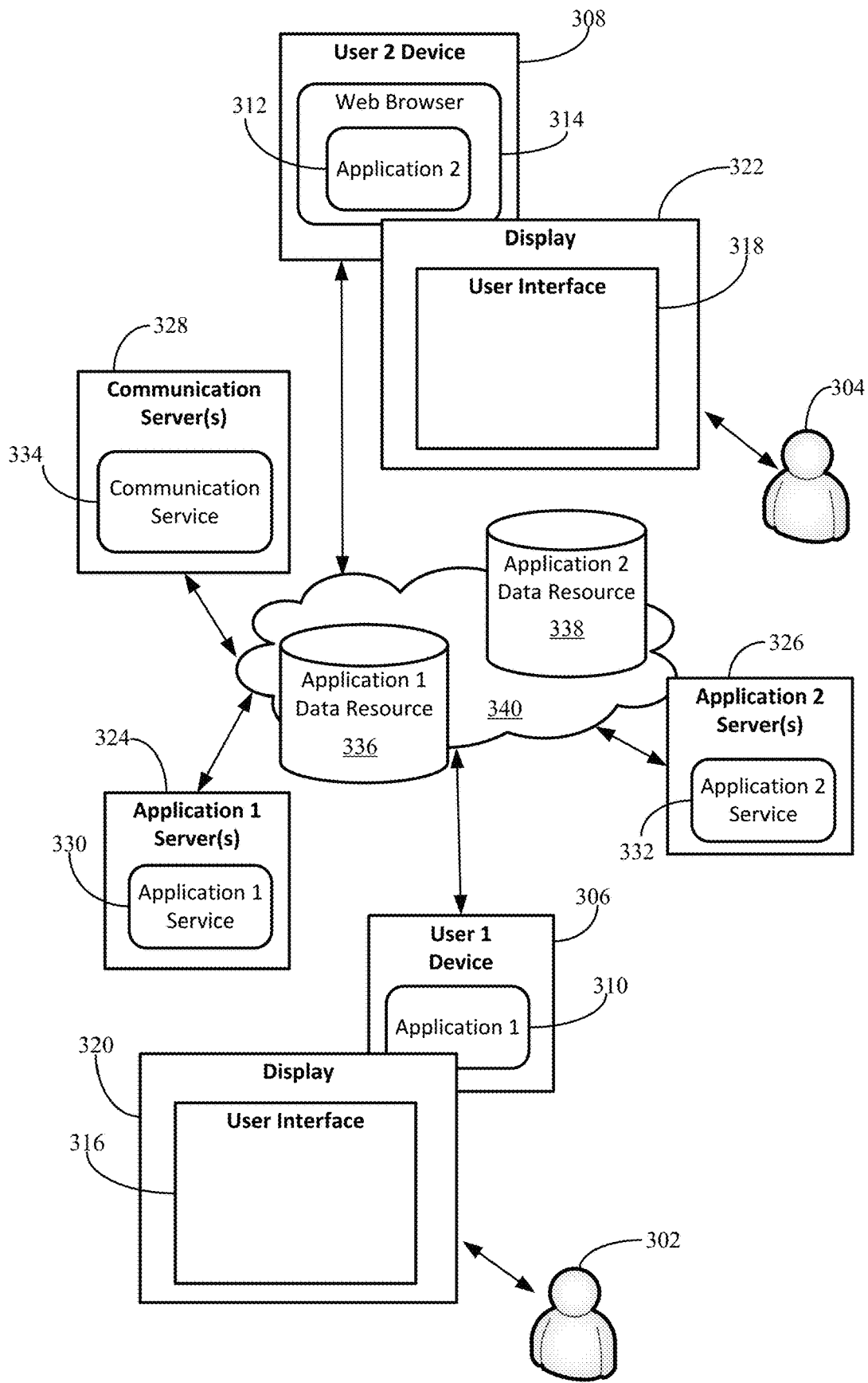
FIG. 3 illustrates an example operating environment in which various embodiments of the invention may be practiced.

FIG. 3 illustrates an example operating environment in which various embodiments of the invention may be practiced. Referring to FIG. 3, an example operating environment can include one or more users (e.g., user 1 302 and user 2 304), one or more user computing devices (e.g., user 1 device 306 and user 2 device 308) running an application (e.g., application 1 310 and application 2 312 executing within the context of web browser application 314) through a UI (e.g., user interface 316 and user interface 318) of the application displayed on a display (e.g., display 320 and display 322) associated with the user computing device, one or more servers (e.g., application 1 server(s) 324, application 2 server(s) 326, and communication server(s) 328) implementing a service (e.g., application 1 service 330, application 2 service 332, and communication service 334), and one or more data resources (e.g., application 1 data resource 336 and application 2 data resource 338).

User computing device (e.g., user 1 device 306 and user 2 device 308) may be configured to receive input from a user (e.g., user 1 302 and user 2 304) through, for example, a microphone, keyboard, mouse, trackpad, touch pad, touch screen, or other input device. The display (e.g., display 320 and display 322) of the user computing device is configured to display one or more user interfaces (including user interface 316 and user interface 318) to the user.

The user computing device (e.g., user 1 device 306 and user 2 device 308) can be, but is not limited to, a personal computer (e.g. desktop computer), laptop, personal digital assistant (PDA), video game device, mobile phone (or smart phone), tablet, slate, terminal, holographic-enabled device, and the like. It should be apparent that the user device may be any type of computer system that provides its user the ability to load and execute software programs and the ability to access a network, such as network 340.

Application 1 310 may be any suitable application which interfaces with a virtual meeting application, such as application 2 312. Application 1 310 may be a program for creating or consuming content, such as a productivity application, a booking and scheduling application, an email application, a calendar application, a virtual meeting or conference application, an education or learning application, an Electronic Health Record ("EHR") application, or a personal digital assistant application.

Application 2 312 may be a virtual meeting application. Examples of virtual meeting applications include, but are not limited to, MICROSOFT TEAMS, GOOGLE MEET, ZOOM MEETINGS, SLACK, and CISCO WEBEX.

The application (e.g., application 1 310 and application 2 312) may be a client-side application and/or a non-client side (e.g., a web-based) application. For example, application 2 312 may be a web application version of a virtual meeting application implemented through web browser application 314 (e.g., a browser-based application that executes in the context of a browser application). For example, user 2 304 may access a WBJ of application 2 312 (e.g., running on application 2 server(s) 326) using web browser application 314). A WBJ provides an application-less virtual meeting joining experience in a web browser (e.g., web browser application 314).

The web browser application 314 is an application for retrieving and traversing information resources on the World Wide Web ("the Web"), as well as resources provided by webservers in private networks via network 340, and presenting the information resources to a user (e.g., rendering for display). Moreover, the web browser application 314 allows a user to access information and various functions provided by a server (e.g., application 2 server(s) 326).

Although reference is made to an "application", it should be understood that the application, such as application 1 310 and application 2 312 can have varying scope of functionality. That is, the application can be a stand-alone application or an add-in or feature of a stand-alone application.

In some cases, the applications (e.g., application 1 310 and application 2 312) utilize one or more services (e.g., application 1 service 330, application 2 service 332, and communication service 334) executed by server(s) (e.g., application 1 server(s) 324, application 2 server(s) 326, and communication server(s) 328) to perform certain of the processes for providing lobby chat with external anonymous guests. It should be understood that server(s) and service(s) may be provided by a single entity or by different entities.

The described lobby chat is exposed to the applications (e.g., application 1 310 and application 2 312) via the communication service 334. Communication service 334 is cloud-based service which exposes chatting and calling capabilities to cross-platform applications via a software development kit (SDK). Examples of cloud-based services include, but are not limited to, AMAZON WEB SERVICES (AWS), MICROSOFT AZURE, and GOOGLE CLOUD PLATFORM.

Application 1 310 includes and/or communicates with one or more data resources (e.g., application 1 data resource 336) and application 2 312 includes and/or communicates with one or more data resources (e.g., application 2 data resource 338)

Components (computing systems, storage resources, and the like) in the operating environment may operate on or in communication with each other over the network 340. The network 340 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 340 may include one or more connected networks (e.g., a multi-network environment) including public networks, such as the Internet, and/or private networks such as a secure enterprise private network. Access to the network 340 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 4:
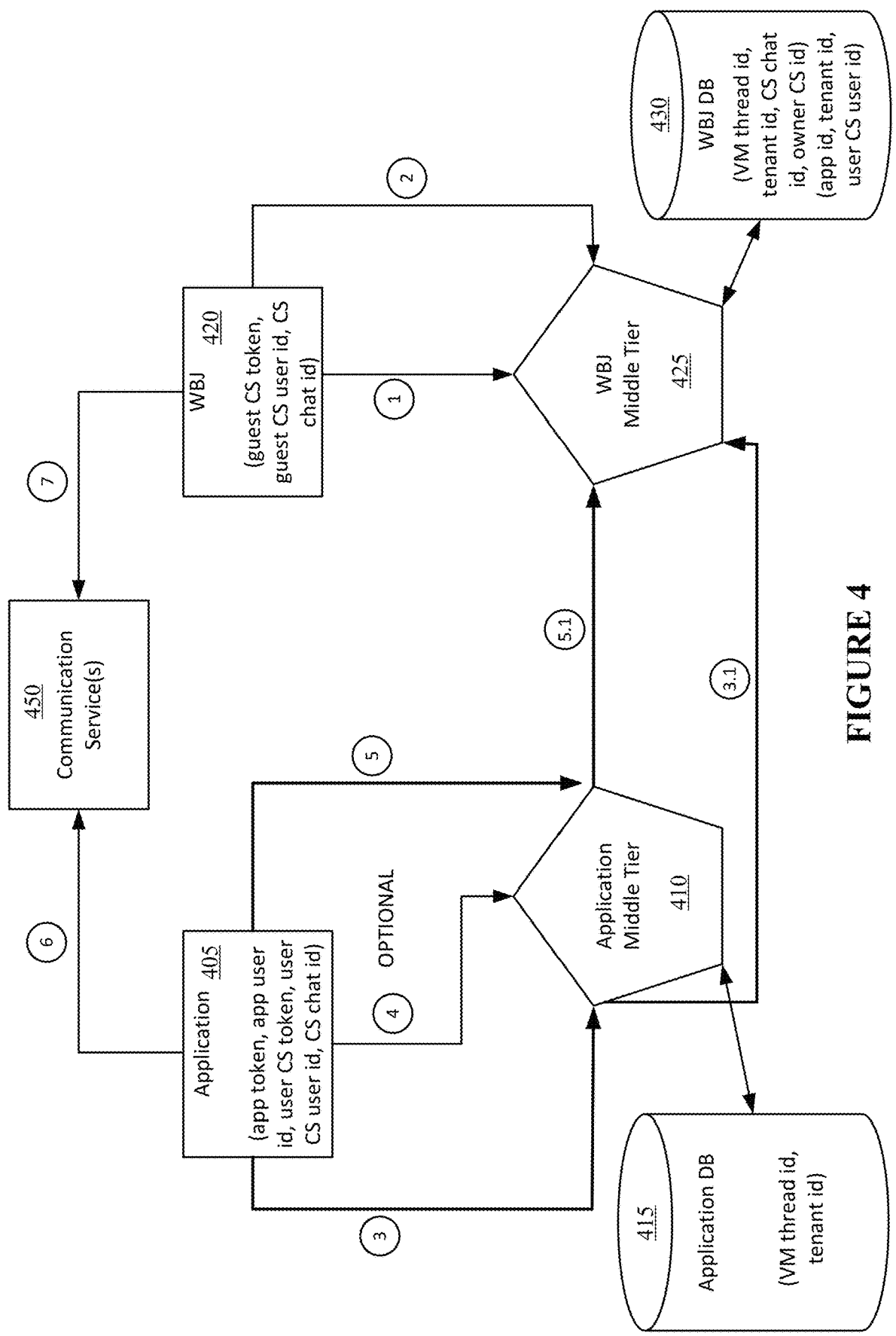
FIG. 4 illustrates an example operating environment and signal flow for providing lobby chat with external anonymous guests according to an embodiment of the invention.

FIG. 4 illustrates an example operating environment and signal flow for providing lobby chat with external anonymous guests according to an embodiment of the invention. Referring to FIG. 4, an example operating environment can include an application 405, application middle tier ("MT") 410, application data resource 415, a web browser join (WBJ) 420, a WBJ MT 425, a WBJ data resource 430, and communication service(s)(CS) 450.

As previously described, lobby chat allows for two-way chat functionality while attendees of a virtual meeting are in a virtual lobby. In particular, lobby chat allows attendees, including external anonymous guests, to communicate with other participants in the virtual lobby even before the attendees have been admitted into the virtual meeting.

Lobby chat is exposed to the application 405 and the WBJ 420 via CS 450. As previously described, a communication service is cloud-based service which exposes chatting and calling capabilities to cross-platform applications via a software development kit (SDK).

An external anonymous guest ("guest") can schedule a virtual meeting with a user from an organization ("user") through application 405. Application 405 is associated with the organization and may be any suitable application which interfaces with a virtual meeting application. The virtual meeting has corresponding virtual meeting information, including a tenant identifier of the organization, a thread identifier, and a virtual meeting organizer identifier. The virtual meeting information is the common knowledge shared between the user and the guest.

In the illustrative example of FIG. 4, the guest is an external anonymous user who does not have an account with the organization associated with the application 405 (e.g., a meeting participant who is from another non-federated tenant or an anonymous user who is not managed by the organization), and the user is an internal attendee having an account with and managed by the organization.

The guest can receive a virtual meeting link, for example via email, allowing the guest to easily join the virtual meeting from a web browser (using WBJ 420) or in the virtual meeting application on any device. As previously described, WBJ 420 provides an application-less virtual meeting joining experience in a web browser. Advantageously, through the described lobby chat the guest can communicate with the user even before the guest has been admitted into the virtual meeting.

To begin the signal flow for lobby chat, the guest can launch the virtual meeting through WBJ 420. When the virtual meeting is launched, WBJ 420 can make a request to WBJ MT 425 to obtain a guest lobby chat identity for the guest, as shown in flow 1. The WBJ MT 425 issues the guest the guest lobby chat identity and the guest is placed in the virtual lobby until the virtual meeting begins.

The request to obtain the guest lobby chat identity for the guest can include the tenant id from the virtual meeting information. Since the lobby chat is exposed via the communication service(s) 450, the guest lobby chat identity is an identity for the communication service(s) 450 and can include a guest CS token and a guest CS user identifier. The guest lobby chat identity can be used to join the virtual meeting and can be reused to initiate the lobby chat. Since the guest is joining the virtual meeting anonymously, the guest lobby chat identity is not linked to any account. Thus, every time the guest relaunches WBJ 420, or refreshes the corresponding web page, a new guest lobby chat identity can be issued to the guest.

In order for the guest to receive chat messages in a lobby chat prior to being admitted to the virtual meeting, the guest must be part of the lobby chat. Additionally, for the user to exchange chat messages with the guest, the user needs to be in the same lobby chat the guest is in. That is, both the guest and the user need to be included in a chat roster for the lobby chat.

Once the guest enters the virtual lobby, the WBJ 420 can make a request to the WBJ MT 425 to have the guest join a lobby chat corresponding to the virtual meeting information given the virtual meeting information, as shown in flow 2. The request for the guest to join the lobby chat includes the guest lobby chat identity and the virtual meeting information, including the tenant identifier and the virtual meeting thread identifier.

The lobby chat can have corresponding lobby chat information comprising a CS chat identifier. The lobby chat can have 1-1 correspondence with a virtual meeting chat so that based on the common knowledge (virtual meeting information), the user and the guest can locate and join into the same lobby chat to exchange messages. This 1-1 mapping information can be persistently stored (e.g., in WBJ data resource 430) and an API can be provided to query the lobby chat given virtual meeting information. The 1-1 mapping information includes the virtual meeting thread identifier, the tenant identifier, the CS chat identifier, and an owner CS identifier. While the lobby chat and the virtual meeting chat have the virtual meeting chat information in common, they are not directly associated with each other.

The WBJ MT 425 can obtain a CS chat identifier for the lobby chat corresponding to the virtual meeting information. In cases where a lobby chat was previously created on behalf of the virtual meeting, the WBJ MT 425 can obtain the CS chat identifier by retrieving the CS chat identifier from the WBJ data resource 430 using the virtual meeting information.

In cases where a lobby chat was not created on behalf of the virtual meeting, the WBJ MT 425 can obtain the CS chat identifier by creating the CS chat identifier. The WBJ MT 425 can create a lobby chat between the guest and the user having the CS chat identifier and a mapping from the virtual meeting information to the CS chat identifier can be stored persistently in the WBJ data resource 430.

Once the WBJ MT 425 has obtained the CS chat identifier, the WBJ MT 425 can add the guest to the chat roster for the lobby chat using the guest lobby chat identity for the guest and the CS chat identifier.

Once the WBJ MT 425 has completed flow 2, the guest joining from WBJ 420 is considered authorized. That is, the guest has a guest lobby chat user identifier and is included in the lobby chat roster. At this point in the signal flow, a mapping of the guest CS token, the guest CS user identifier, and the CS chat identifier is stored associated with the guest locally at the WBJ; and a mapping of the virtual meeting thread identifier, the tenant identifier, the CS chat identifier, and the owner CS identifier is also stored at the WBJ data resource 430. As mentioned above, the user needs to be in the same lobby chat with the guest. The user has an account with the application 405 as well as an application user identity comprising an application user identifier for the user and an application token. However, the user's application identity cannot be used to join a lobby chat. Given only a lobby chat identity can join lobby chat, the user also needs to be issued a lobby chat identity. Hence, the user is issued two identities, one for the application 405 and the other one for the lobby chat (via the communication service(s) 450). The WBJ MT 425 can issue a user CS user identity and user CS token to the user via flow 3 and flow 3.1.

If it is the first time the application 405 is launched by the user, a new user CS lobby chat identity can be associated with the application identity of the user and stored in the WBJ data resource 430. In some cases, the mapping is stored for less than 24 hours.

For each subsequential launch of the application 405 in less than 24 hours, WBJ MT 425 can retrieve the user CS lobby chat identity given the application identity and issue a new user CS token. In some cases, the user CS token is stored along with the mapping of the user CS lobby chat identity and application identity of the user in the WBJ data resource 430.

For each subsequential launch of the application 405 by the user in more than 24 hours, the flow can follow how it works in first time launch (e.g., as if it is the first time the application 405 is launched by the user).

If the user stays in the application 405 for more than 24 hours and the assigned user CS token has expired, a new user CS token can be requested from the WBJ MT 425 given the user CS user identity in the user's current session.

In more detail, when the user launches the application 405, the application 405 can communicate a request for a lobby chat identity for the user to the application MT 410, as shown in flow 3.

The application MT 410 can communicate the request for the lobby chat identity for the user to the WBJ MT 425, as shown in flow 3.1. The request for the lobby chat identity for the user can include the application user identifier for the user, the application token, and the tenant identifier. The lobby chat identity for the user can include a user CS token and a user CS user identifier for the user.

WBJ MT 425 can determine if a CS user identifier has been linked to the application user identifier. If a CS user identifier has been linked to the application user identifier, the WBJ MT 425 can return the user CS user identifier and the user CS token. If a CS user identifier has not been linked to the application user identifier, the WBJ MT 425 can create the user CS user identifier and then return the user CS user identifier and the user CS token. The WBJ MT 425 can link the user CS user identifier to the application user identifier and store the mapping in the WBJ data resource 430.

The linking of the user CS user identifier to the application user identifier in the WBJ data resource 430 allows the WBJ MT 425 to know which CS user identifier to use to represent the user in the lobby chat based on the application user identifier being used to communicate with the WBJ MT 425. Therefore, within 24 hours, whenever the user logs into the application 405 and joins a lobby chat, the WBJ MT 425 can retrieve the same CS user identifier that is linked to the user from the WBJ data resource 430 and add the user into the lobby chat.

In some cases, the user CS token will expire in 24 hours. If the user stays logged into the application 405 for more than 24 hours and the user CS token expires, the application 405 can communicate a request for a new user CS token for the user to the application MT 410. The request for the new user CS token for the user can include the user CS user identifier, the application token, and the tenant identifier. In this case, the application MT 410 can communicate the request for the new user CS token for the user to the WBJ MT 425 and the WBJ MT 425 can return a new user CS token.

In some cases, a lobby chat icon is only presented in the application 405 (or even the WBJ 420) for active virtual meetings where the guest is in the virtual lobby. For virtual meetings where the guest has been admitted into the virtual meeting or virtual meetings that have not started yet, the lobby chat icon may not be presented in the application 405 or the WBJ 420.

To determine the status of a virtual meeting, the application 405 can poll the application MT 410 for the status, as shown in optional flow 4. The polling can take place at a set time interval or frequency. If the polling determines that a virtual meeting has started, the lobby chat icon can be enabled.

With a lobby chat icon presented to the user in the application 405 for a virtual meeting, the user can select the icon and join the lobby chat with the guest. The application 405 can send a request to initiate the lobby chat between the user and the guest to the application MT 410, as shown in flow 5. The application MT 410 can then communicate the request to initiate the lobby chat between the user and the guest to the WBJ MT 425, as shown in flow 5.1. The request can include the application token, the user CS user identifier for the user, and the virtual meeting information.

In response to receiving the request to initiate the lobby chat between the user and the guest, the WBJ MT 425 can initiate the lobby chat. To initiate the lobby chat, the WBJ MT 425 can check if a CS chat identifier for the lobby chat has been linked to the virtual meeting thread identifier. If the CS chat identifier for the lobby chat has been linked to the virtual meeting thread identifier, the lobby chat has already been created and initialized. The WBJ MT 425 can include user CS user identifier for the user as part of the lobby chat. That is, the user CS user identifier for the user is added to the chat roster for the lobby chat. Any subsequent requests to join the lobby chat by additional users/guests can be performed by adding them into the chat roster for the lobby chat.

If the CS chat identifier for the lobby chat has not been linked to the virtual meeting thread identifier, the WBJ MT 425 can create a new lobby chat, link the new lobby chat to the virtual meeting thread identifier, store the mapping in the WBJ data resource 430, and then include the user CS user identifier for the user as part of the lobby chat.

To participate in the lobby chat, application 405 and WBJ 420 can communicate directly to the CS 450. Application 405 and WBJ 420 are connected directly to the CS 450 through a connection established when the user and the guest are added to the lobby chat (flow 2/2.1 and flow 5/flow 5.1)

Having ensured that the user CS user identifier for the user has joined into the lobby chat (as shown in flow 5/flow 5.1), the user can start sending and receiving messages from the guest through the lobby chat. The application 405 can send and/or receive messages in the lobby chat by directly communicating a chat message to the CS 450, as shown in flow 6. The chat message can include the user CS token, the user CS user identifier for the user, and the CS chat identifier.

Similar to the application 405, the WBJ 420 can send and/or receive messages in the lobby chat by directly communicating a chat message to the CS 450, as shown in flow 7. The chat message can include the guest CS token, the guest CS user identifier for the user, and the CS chat identifier.

In some cases, the guest may not be able to initiate a lobby chat. That is, the guest may only receive and send messages after the user has initiated the lobby chat (as shown in flow 6). Here, the polling shown in flow 4 may not be necessary. After the user initiated the lobby chat, a lobby chat UI can be presented to the guest and the guest can exchange messages with the user.

In some cases, when the lobby chat is created, the WBJ MT 425 can also create a lobby chat user who is the "owner" of the lobby chat. The "owner" is an automated authority/participant that manages the lobby chat (e.g., add users/guests to the chat roster of the lobby chat). Since the CS identities for both the guest and the user are ephemeral, the owner can be used as a permanent identity to manage the chat. The owner's CS identity is also saved in the mapping containing the virtual meeting chat thread identifier, tenant identifier, and CS chat identifier within the WBJ data resource 430. Thus, the same owner CS identity can be retrieved for managing the lobby chat.

The identifiers of the user and the lobby chat thread can be stored persistently. When the virtual meeting concludes, the whole lobby chat history from the "owner" can be queried. The query request can be initiated from the organizer of the virtual meeting lobby chat and the organizer can post the history to meeting chat with a proper format, e.g., a transcript or a file attachment. This will make sure all messages from the guest or the user are discoverable as the whole history can be provided to the mailbox of the user.

Figure 5A:
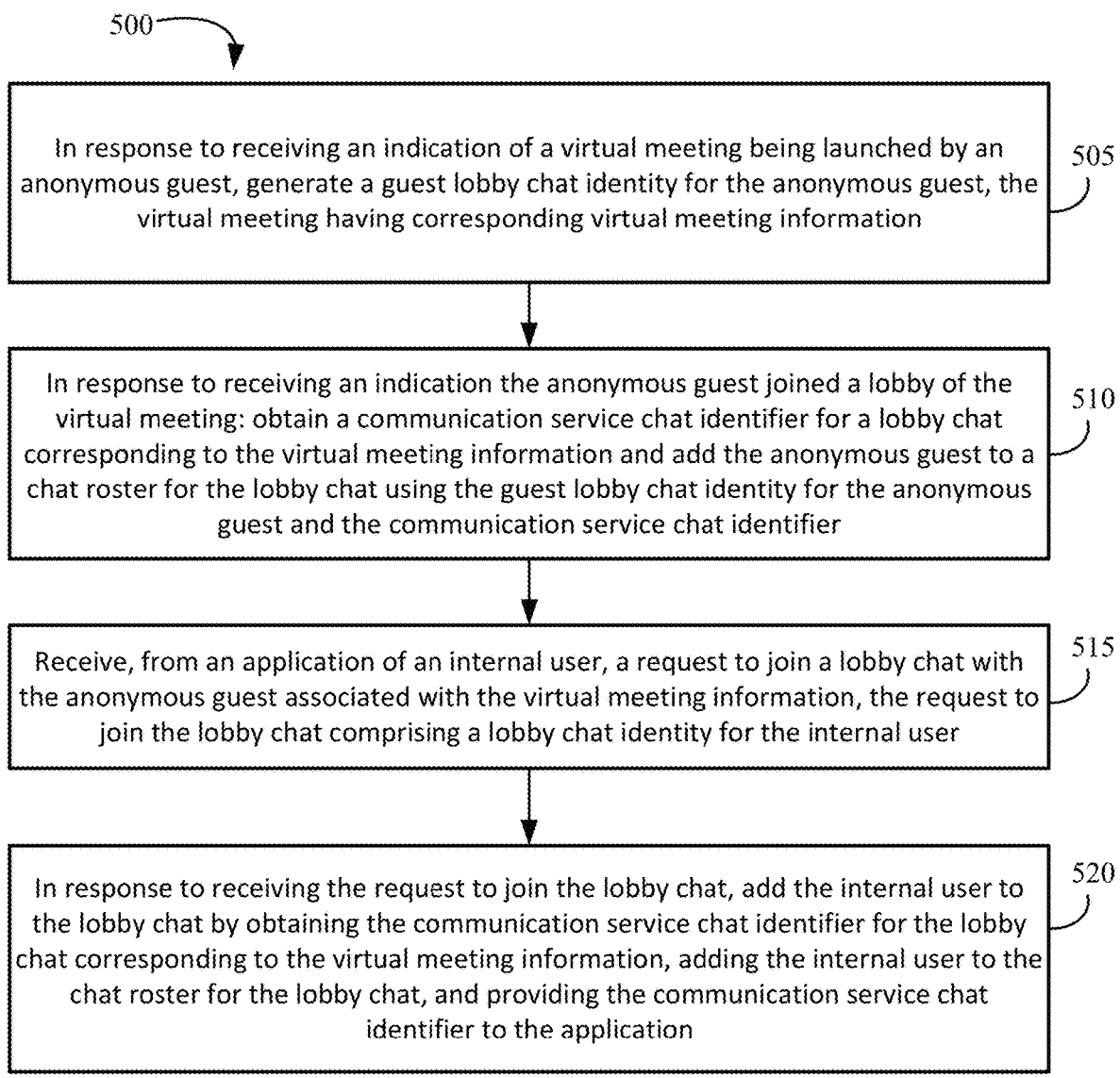
FIG. 5A and FIG. 5B illustrate example process flow diagrams of methods for providing lobby chat with external anonymous guests according to embodiments of the invention.
Figure 5B:
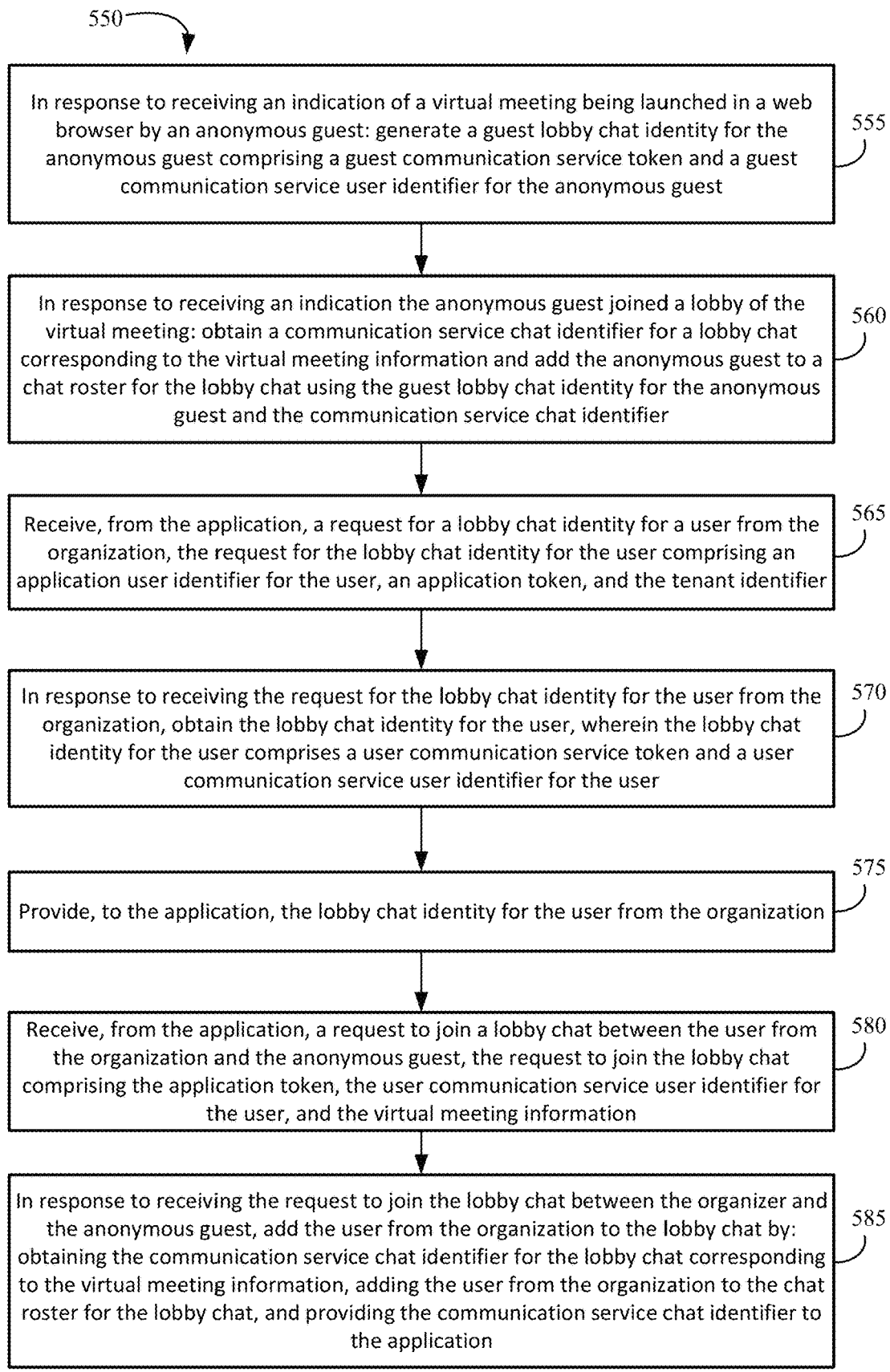

FIG. 5A and FIG. 5B illustrate example process flow diagrams of methods for providing lobby chat with external anonymous guests according to embodiments of the invention. Referring to FIG. 5A and FIG. 5B, lobby chat with external anonymous guests is supported by a WBJ MT (e.g., WBJ MT 425 described in FIG. 4) and/or an application service (e.g., application 2 service 332 described in FIG. 3), which may support lobby chat process 500 of FIG. 5A and lobby chat process 550 of FIG. 5B (each of which can involve the signal flows described with respect to FIG. 4). The WBJ MT and the application service can be implemented by a server, such as application 2 server(s) 326 shown in FIG. 3, which can be embodied as described with respect to computing system 700 shown in FIG. 7 and even, in whole or in part, by a user computing device, such as user 2 device 308 shown in FIG. 3. Lobby chat process 550 of FIG. 5B illustrates a specific implementation of lobby chat process 500 of FIG. 5A.

Referring to FIG. 5A, at operation (505), in response to receiving an indication of a virtual meeting being launched by an anonymous guest, the WBJ MT can generate a guest lobby chat identity for the anonymous guest, wherein the virtual meeting has corresponding virtual meeting information.

At operation (510), in response to receiving an indication the anonymous guest joined a lobby of the virtual meeting the WBJ MT can obtain a communication service chat identifier for a lobby chat corresponding to the virtual meeting information, the lobby chat providing two-way chat functionality while any attendees of the virtual meeting are in the lobby; and add the anonymous guest to a chat roster for the lobby chat using the guest lobby chat identity for the anonymous guest and the communication service chat identifier.

At operation (515), the WBJ MT can receive, from an application of an internal user, a request to join a lobby chat with the anonymous guest associated with the virtual meeting information, the request to join the lobby chat comprising a lobby chat identity for the internal user.

At operation (520), in response to receiving the request to join the lobby chat, the WBJ MT can add the internal user the lobby chat by obtaining the communication service chat identifier for the lobby chat corresponding to the virtual meeting information; adding the internal user to the chat roster for the lobby chat using the lobby chat identity for the internal user and the communication service chat identifier; and providing the communication service chat identifier to the application.

Referring to FIG. 5B, at operation (555), in response to receiving an indication of a virtual meeting being launched in a web browser by an anonymous guest, the WBJ MT can generate a guest lobby chat identity for the anonymous guest. The virtual meeting can be scheduled in an application associated with an organization and can include corresponding virtual meeting information including a virtual meeting thread identifier and a tenant identifier of the organization.

The anonymous guest can be an external attendee of the virtual meeting. As previously described, an external attendee is an anonymous user who does not have an account with the organization associated with the virtual meeting application (e.g., a meeting participant who is from another non-federated tenant or anonymous user who is not managed by the organization).

The guest lobby chat identity for the anonymous guest can include a guest communication service (CS) token and a guest communication service (CS) user identifier for the anonymous guest. The guest lobby chat identity can be used to join the virtual meeting and can be reused to join the lobby chat. Since the guest is joining the virtual meeting anonymously, the guest lobby chat identity is not linked to any account with the organization. Thus, every time the guest relaunches the WBJ, or refreshes the corresponding web page, a new guest lobby chat identity can be issued to the guest.

At operation (560), in response to receiving an indication the anonymous guest joined a lobby of the virtual meeting, the WBJ MT can obtain a communication service chat identifier for a lobby chat corresponding to the virtual meeting information and add the anonymous guest to a chat roster for the lobby chat using the guest lobby chat identity for the anonymous guest and the CS chat identifier.

The lobby chat provides two-way chat functionality while attendees of the virtual meeting are in the lobby. Here, the lobby chat provides two-way chat functionality while both the guest and the user are in the virtual lobby of the virtual meeting.

The lobby chat can have corresponding lobby chat information comprising a CS chat identifier. As previously described, the lobby chat can have 1-1 correspondence with a virtual meeting chat so that based on the common knowledge (virtual meeting information), the user and the guest can locate and join into the same lobby chat to exchange messages. This 1-1 mapping information can be persistently stored in a data resource, such as WBJ data resource 430 shown in FIG. 4. The data resource can store mappings between CS chat identifiers and virtual meeting information for a plurality of virtual meetings. The 1-1 mapping information includes the virtual meeting thread identifier, the tenant identifier, the owner CS identifier, and the CS chat identifier.

The WBJ MT can obtain the CS chat identifier for the lobby chat corresponding to the virtual meeting information in various ways.

In cases where a lobby chat was previously created on behalf of the virtual meeting, the WBJ MT can obtain the CS chat identifier by retrieving the CS chat identifier from the data resource using the virtual meeting information. Here, An API can be provided to query the lobby chat given virtual meeting information. A lobby chat is initiated/created by the first person who joins the lobby chat.

In cases where a lobby chat was not created on behalf of the virtual meeting, the WBJ MT can obtain the CS chat identifier by creating the CS chat identifier for the lobby chat. Here, the CS chat identifier is created and returned when the lobby chat is created or initialized. The WBJ MT can store the CS chat identifier for the lobby chat linked to the virtual meeting information in a data resource, such as WBJ data resource 430 shown in FIG. 4. The CS chat identifier for the lobby chat can also be stored, for example, locally linked to the guest lobby chat identity for the guest (e.g., the guest CS user identity and guest CS token).

Once the WBJ MT has obtained the CS chat identifier, the WBJ MT can add the guest to the chat roster for the lobby chat using the guest lobby chat identity for the guest and the CS chat identifier. The guest joining from the WBJ can then be considered authorized. That is, the guest has a guest lobby chat user identifier and is included in the lobby chat roster.

At operation (565), the WBJ MT can receive a request for a lobby chat identity for a user from the organization. The request for the lobby chat identity for the user comprising; The request for the lobby chat identity for the user can be received from the application associated with an organization when the user launches the application and can include an application user identifier for the user, an application token, and the tenant identifier As previously mentioned, the user needs to be in the same lobby chat with the guest. The user has an account with the application associated with the organization as well as an application user identity comprising an application user identifier for the user and an application token. However, the user's application identity cannot be used to join a lobby chat. Given only a lobby chat identity can join lobby chat, the user also needs to be issued a lobby chat identity. Hence, the user is issued two identities, one for the application associated with the organization and the other one for the lobby chat (via the communication service(s)).

At operation (570), in response to receiving the request for the lobby chat identity for the user from the organization, the WBJ MT can obtain the lobby chat identity for the user; and at operation (575), the WBJ MT can provide, to the application, the lobby chat identity for the user from the organization. The lobby chat identity for the user comprises a user CS token and a user CS user identifier for the user.

The WBJ MT can determine if a CS user identifier has been linked to the application user identifier. In response to determining a user CS user identity has been linked to the application user identifier for the user, the WBJ MT can retrieve the lobby chat identity for the user. In response to determining a user CS user identity has not been linked to the application user identifier for the user, the WBJ MT can create the lobby chat identity for the user; and store the lobby chat identity for the user linked to the application user identifier and the tenant identifier.

For example, if it is the first time the application is launched by the user, a new user CS lobby chat identity can be associated with the application identity of the user and stored in the data resource. In some cases, the mapping is stored for less than 24 hours.

For each subsequential launch of the application in less than 24 hours, the WBJ MT can retrieve the user CS lobby chat identity given the same parameters provided in the first CS lobby chat identity call (i.e., application user identifier, application token, tenant identifier) and issue a new user CS token. In some cases, the user CS token is stored along with the mapping of the user CS lobby chat identity and application identity of the user in the WBJ data resource.

For each subsequential launch of the application by the user in more than 24 hours, the flow can follow how it works in first time launch (e.g., as if it is the first time the application is launched by the user). That is, a mapping of the CS lobby chat identity and application identity exists, and no new CS lobby chat identity needs to be created.

In some cases, the WBJ MT can receive a request for a new user CS token for the user from the application. The request for the new CS token can include the user CS user identifier, the application token, and the tenant identifier. For example, if the user stays in the application for more than 24 hours and the assigned user CS token has expired, a new user CS token can be requested from the WBJ MT given the user CS user identity in the user's current session. Then, in response to receiving the request for the new user CS token, the WBJ MT can obtain the new user CS token for the user; and provide the new user CS token for the user to the application. That is, a new CS lobby chat identity for the user needs to be created and mapped to the application identity for the user.

As previously described, the linking (mapping) of the user CS user identifier to the application user identifier in the data resource allows the WBJ MT to know which CS user identifier to use to represent the user in the lobby chat based on the application user identifier being used to communicate with the WBJ MT. Therefore, within 24 hours, whenever the user logs into the application and joins a lobby chat, the WBJ MT can retrieve the same CS user identifier that is linked to the user from the data resource and add the user into the lobby chat.

At operation (580), the WBJ MT can receive a request to join a lobby chat between the user from the organization and the anonymous guest. The request to join the lobby chat is a request for the user to join the lobby chat and can include the application token, the user CS user identifier for the user, and the virtual meeting information. The request to join the lobby chat is received from the application when, for example, the user selects a lobby chat icon.

At operation (585), in response to receiving the request to join the lobby chat between the organizer and the anonymous guest, the WBJ MT can add the user to the lobby chat by obtaining the CS chat identifier for the lobby chat corresponding to the virtual meeting information; adding the user from the organization to the chat roster for the lobby chat using the lobby chat identity for the user and the CS chat identifier; and providing the CS chat identifier to the application.

The WBJ MT can obtain the CS chat identifier by determining if a CS chat identifier for the lobby chat has been linked to the virtual meeting thread identifier. If the CS chat identifier for the lobby chat has been linked to the virtual meeting thread identifier, the WBJ MT can include user CS user identifier for the user as part of the lobby chat. That is, the user CS user identifier for the user is added to the chat roster for the lobby chat.

If the CS chat identifier for the lobby chat has not been linked to the virtual meeting thread identifier, the WBJ MT can create a new lobby chat, link the new lobby chat to the virtual meeting thread identifier, store the mapping in the data resource, and then include the user CS user identifier for the user as part of the lobby chat roster.

At the end of process 550, both the guest and the user are included in a chat roster for the lobby chat corresponding to the virtual meeting; and the guest can exchange chat messages with the user in the lobby chat while they are in the virtual lobby. To participate in the lobby chat, application and WBJ can communicate directly to the CS. Application and WBJ are connected directly to the CS through a connection established when the user and the guest are added to the lobby chat roster.

When the guest sends a lobby chat message to the user, the WBJ can communicate the lobby chat message to CS. The lobby chat message sent by the guest can include the guest CS token, the guest CS user identifier for the anonymous guest and the CS chat identifier.

When the guest receives a lobby chat message from the user, the WBJ can receive a lobby chat message from the CS.

The lobby chat message received from the user can include the CS service user identifier for the user and the CS chat identifier.

As previously described, the virtual meeting comprises a virtual meeting chat. While the virtual meeting chat and the lobby chat have virtual meeting information in common, the virtual meeting chat and the lobby chat are not directly associated with each other. Indeed, the the virtual meeting chat and the lobby chat are two distinct chats. Once an attendee is admitted to the virtual meeting from the virtual lobby, the attendee is transferred from the lobby chat to the virtual meeting chat. For example, in response to receiving an indication the anonymous guest has been admitted to the virtual meeting, the WBJ MT can add the anonymous guest to a virtual meeting chat roster of a virtual meeting chat.

Figure 6:
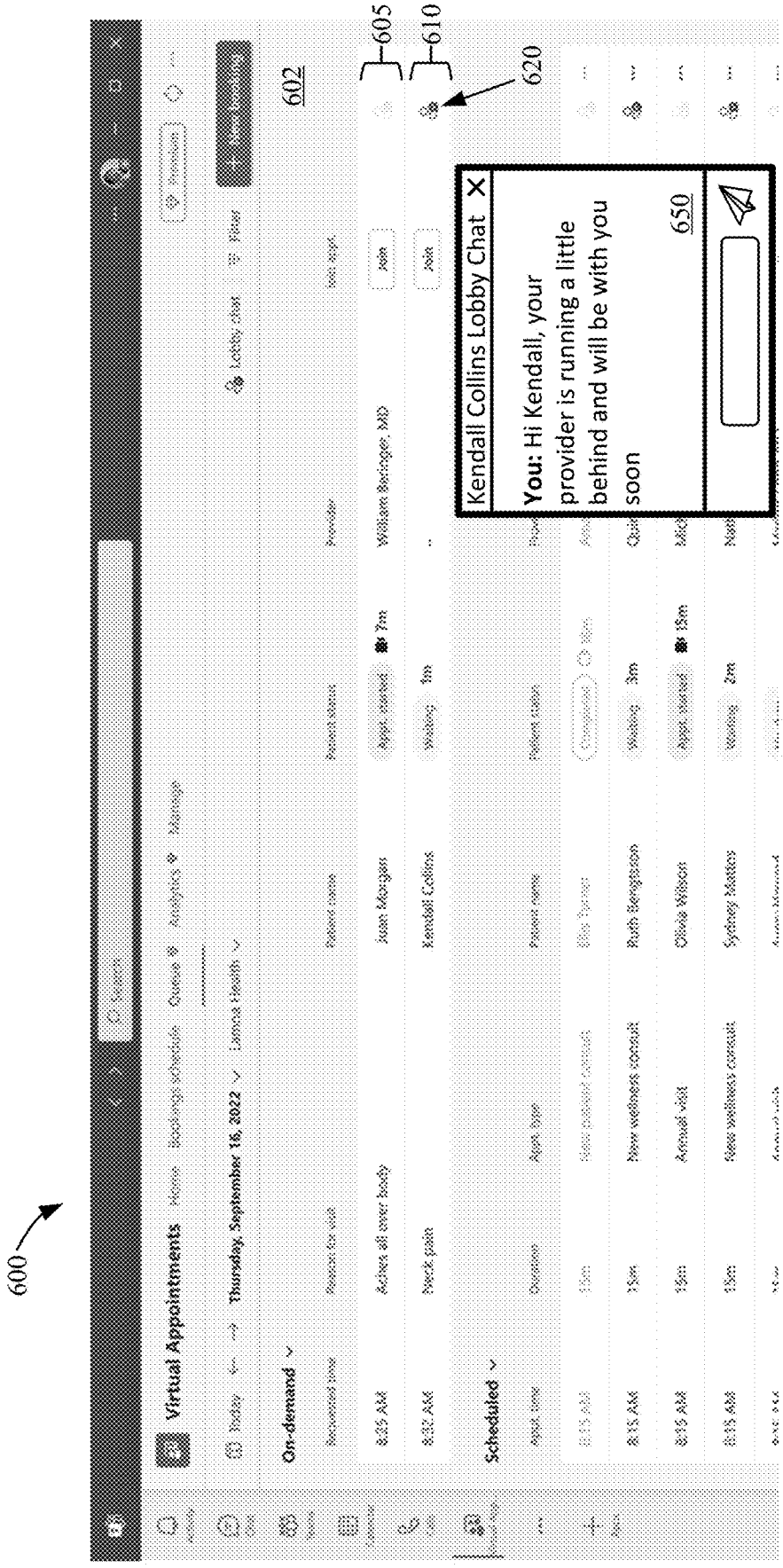
FIG. 6 illustrates example lobby chat experiences for an organizer of a virtual meeting according to an embodiment of the invention.

FIG. 6 illustrates example lobby chat experiences for an organizer of a virtual appointment in a healthcare setting according to an embodiment of the invention. In a healthcare setting, healthcare organizations can conduct secure and efficient virtual visits between patients and providers for therapy sessions and medical services. Typically, healthcare virtual appointments are managed in Electronic Health Record (EHR) systems. An EHR refers to the systematized collection of patients and population electronically stored health information in a digital format. EHRs store information such as, but not limited to, demographics, medical history, diagnoses, immunizations, notes, laboratory and radiology data and vitals. Vendors providing cloud-based EHR solutions include, but are not limited to, Epic Systems Corporation, Oracle Cerner, and MEDITECH. Healthcare team members can access the EHR system through an EHR provider portal and patients can access the EHR system through an EHR patient portal.

Currently, a provider must access an individual virtual appointment for a patient through the EHR provider portal within the EHR system. Within this EHR provider portal, the provider cannot chat with the patient and can only access one virtual appointment at a time.

Further, providers are sometimes unable to launch a virtual appointment from their EHR provider portal (e.g., either the EHR provider portal is down or the provider doesn't have access) but still want to meet with their patients for their scheduled healthcare appointments. Advantageously, an EHR queue view provides a separate view for the providers to have access to a list view of scheduled appointments for an organization. The EHR queue view facilitates virtual appointment launches outside of the EHR systems. Thus, the provider can still meet with their patient even when the EHR provider portal is down.

The terms "queue view" and "list view" are used interchangeably herein.

Referring to FIG. 6, a user associated with a healthcare organization, such as a provider or an organizer of a healthcare virtual appointment, may open an application 600 on their computing device. The computing device can be, but is not limited to, a personal computer (e.g., desktop computer), a laptop computer, personal digital assistant (PDA), video game device, mobile phone (or smart phone), tablet, slate, terminal, holographic-enabled device, and the like.

The application 600 can be a virtual meeting EHR connector application. An EHR connector makes it easy for clinicians to launch a virtual patient appointment or consultation with another provider in an application directly from the EHR system. The EHR connector listens to appointment Health Level 7 (HL7) events (e.g., on create, update or delete). HL7 refers to a set of international clinical standards and messaging formats that provide a framework for the management, integration, exchange, and retrieval of electronic information across different healthcare systems. That is, the EHR connector exposes an endpoint that listens to HL7 payloads posted from the EHR system whenever an appointment is created, updated, or deleted.

To provide the EHR queue view 602, an HL7 interface can be used to receive the HL7 events whenever an appointment is created, updated or deleted. Details can be extracted from each HL7 message and stored. The details include, but are not limited to, appointment identifier, session identifier, duration of the appointment, appointment start time with UTC offset, patient name associated with the appointment, department name, provider name and provider identifier, and provider identifier type, Through a EHR queue view 602 of application 600, the provider can be provided quick access to features such as, but not limited to, providing a list of upcoming virtual appointments scheduled for the day (or multiple days) to the health care team with filter and search options; launching a virtual meeting for already scheduled health care appointments; copying and sending meeting join URLs to patients through SMS or email; and providing an option to export the list of appointments data. Indeed, the EHR queue view 602 can help the provider schedule, manage, and conduct virtual appointments with patients. The EHR queue view 602 can help manage scheduled appointments as well as on-demand requests in one location. Through a website, clients can self-schedule an appointment or join a queue in real-time without scheduling an appointment prior.

In the illustrative example of FIG. 6, the EHR queue view 602 displays a list of appointments with corresponding appointment information, including, but not limited to, requested time, reason for visit, patient name, patient status, provider, appointment time, duration, appointment type.

The virtual appointments can include a lobby chat icon and a join icon. The lobby chat icon allows the organizer to access the lobby chat functionality to initiate a lobby chat and chat with attendees waiting in the virtual appointment lobby and the join icon allows the organizer to join the virtual appointment.

The lobby chat icon and the join icon may not always be available to select. In some cases, the lobby chat icon is only selectable when the attendee is waiting in the virtual appointment lobby (e.g., when the status is "waiting") and Here, the EHR queue view 602 shows two on-demand requests for a virtual appointment (e.g., virtual appointment 605 and virtual appointment 610). The patient status for virtual appointment 610 is "Waiting" thus the patient is in a virtual lobby waiting for the provider to begin the appointment. Since the patient ("Kendall Collins") for virtual appointment 610 is waiting in the virtual appointment lobby the lobby chat functionality is available and a lobby chat icon (e.g., lobby chat icon 620) is available to select.

When the provider knows one of his previous appointments is running longer than expected, the provider can send a message into the virtual lobby to let the next patient know they'll be late. The provider can select the lobby chat icon 620 for virtual appointment 610 to initiate a lobby chat with the patient.

When the provider initiates the lobby chat, a lobby chat user interface (UI) is presented to allow the organizer to exchange chat messages with an attendee in the lobby, such as an external anonymous guest. In the illustrative example of FIG. 6, the provider selected lobby chat icon 620 and lobby chat UI 650 is presented. Through the lobby chat UI 650, the provider can send and receive chat messages from the patient. The message sent from the provider to the patient via the lobby chat UI 650 includes "Hi Kendall, your provider is running a little behind and will be with you soon".

Figure 7:
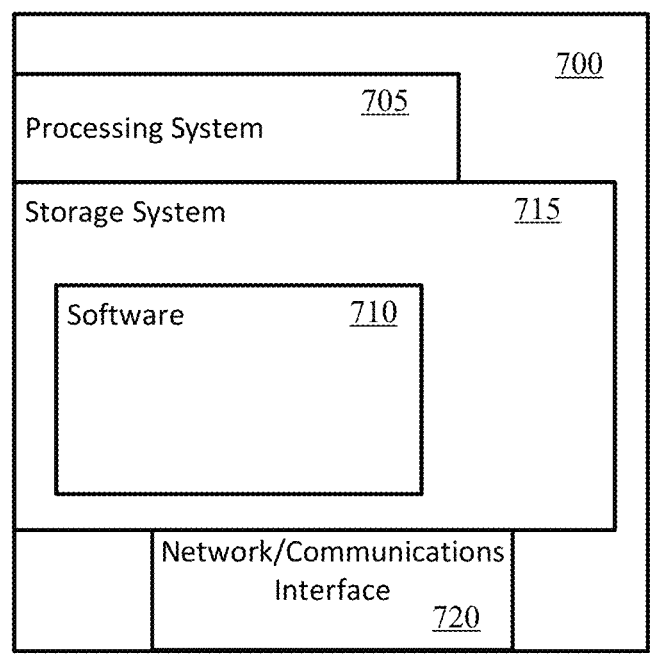
FIG. 7 illustrates components of an example computing system that may be used to implement certain methods and services described herein.

FIG. 7 illustrates components of an example computing system that may be used to implement certain methods and services described herein. Referring to FIG. 7, system 700 may be implemented within a single computing device or distributed across multiple computing devices or sub-systems that cooperate in executing program instructions. Accordingly, more or fewer elements described with respect to system 700 may be incorporated to implement a particular system. The system 700 can include one or more blade server devices, standalone server devices, personal computers, routers, hubs, switches, bridges, firewall devices, intrusion detection devices, mainframe computers, network-attached storage devices, and other types of computing devices.

In embodiments where the system 700 includes multiple computing devices, the server can include one or more networks that facilitate communication among the computing devices. For example, the one or more networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

System 700 can include processing system 705 of one or more processors to transform or manipulate data according to the instructions of software 710 stored on a storage system 715. Examples of processors of the processing system 705 include general purpose central processing units (CPUs), graphics processing units (GPUS), field programmable gate arrays (FPGAs), application specific processors, and logic devices, as well as any other type of processing device, combinations, or variations thereof.

Software 710, including routines for performing processes, such as process 500 described with respect to FIG. 5, may be implemented in program instructions and among other functions may, when executed by system 700 in general or processing system 705 in particular, direct the system 700 or processing system 705 to operate as described herein.

Storage system 715 may comprise any suitable computer readable storage media. Storage system 715 may include volatile and nonvolatile memories, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media. In no case do storage media consist of transitory, propagating signals.

Storage system 715 may be implemented as a single storage device but may also be implemented across multiple storage devices or sub-systems co-located or distributed relative to each other. Storage system 715 may include additional elements, such as a controller, capable of communicating with processing system 705.

Network/communication interface 720 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a processing system;
   a storage system; and
   instructions stored on the storage system that, when executed by the processing system, direct the processing system to at least:
   in response to receiving an indication of a virtual meeting being launched by a guest, generate a guest lobby chat identity for the guest, wherein the virtual meeting has corresponding virtual meeting information;
   in response to receiving an indication that the guest joined a lobby of the virtual meeting:
   obtain a communication service chat identifier for a lobby chat corresponding to the virtual meeting information, the lobby chat providing two-way chat functionality between an internal user, who has an account with an organization associated with a virtual meeting application hosting the virtual meeting, and the guest while the guest is in the lobby, wherein the guest is a user who does not have an account with the organization associated with the virtual meeting application, and wherein the two-way chat is conducted without having to admit the guest into the virtual meeting; and
   add the guest to a chat roster for the lobby chat using the guest lobby chat identity for the guest and the communication service chat identifier;
   receive, from the virtual meeting application of the internal user, a request to join the lobby chat with the guest associated with the virtual meeting information, the request to join the lobby chat comprising a lobby chat identity for the internal user; and
   in response to receiving the request by the internal user to join the lobby chat, add the internal user to the lobby chat with the guest by:
   obtaining the communication service chat identifier for the lobby chat corresponding to the virtual meeting information;
   adding the internal user to the chat roster for the lobby chat using the lobby chat identity for the internal user and the communication service chat identifier; and
   providing the communication service chat identifier to the virtual meeting application; and
   in response to receiving an indication the guest has been admitted to the virtual meeting, adding the guest to a virtual meeting chat roster of a virtual meeting chat, the virtual meeting chat and the lobby chat being two distinct chats.

2. The system of claim 1, wherein the instructions to obtain the communication service chat identifier for the lobby chat corresponding to the virtual meeting information direct the processing system to:
   in response to determining the lobby chat has been created, retrieve, from a data resource storing mappings between communication service chat identifiers and virtual meeting information for a plurality of virtual meetings, the communication service chat identifier using the virtual meeting information.

3. The system of claim 1, wherein the instructions to obtain the communication service chat identifier for the lobby chat corresponding to the virtual meeting information direct the processing system to:
   in response to determining the lobby chat has not been created:
   create the communication service chat identifier for the lobby chat; and
   store the communication service chat identifier for the lobby chat linked to the virtual meeting information in a data resource storing mappings between communication service chat identifiers and virtual meeting information for a plurality of virtual meetings.

4. The system of claim 1, wherein the instructions further direct the processing system to:
   receive, from the application, a request for the lobby chat identity for the internal user, the request for the lobby chat identity for the internal user comprising an application user identifier for the internal user, an application token, and a tenant identifier;
   in response to receiving the request for the lobby chat identity for the internal user, obtain the lobby chat identity for the internal user by:

in response to determining a user communication service user identity has been linked to the application user identifier for the internal user, retrieving the lobby chat identity for the internal user; and in response to determining a user communication service user identity has not been linked to the application user identifier for the internal user:

creating the lobby chat identity for the internal user; and storing the lobby chat identity for the internal user linked to the application user identifier and the tenant identifier; and provide, to the application, the lobby chat identity for the internal user, the lobby chat identity for the internal user comprising a user communication service token and a user communication service user identifier for the internal user.

5. The system of claim 1, wherein the guest lobby chat identity for the guest comprises a guest communication service token and a guest communication service user identifier for the guest, wherein the instructions further direct the processing system to:

communicate, to a communication service, a guest lobby chat message comprising the guest communication service token, the guest communication service user identifier for the guest, and the communication service chat identifier.

6. The system of claim 1, wherein the lobby chat identity for the internal user comprises a user communication service token and a user communication service user identifier for the internal user, wherein the instructions further direct the processing system to:

receive, from a communication service, a user lobby chat message comprising the user communication service user identifier for the internal user and the communication service chat identifier.

7. The system of claim 1, wherein the guest is an guest that is an external attendee of the virtual meeting.

8. The system of claim 1, wherein the instructions further direct the processing system to:

receive, from the application, a request for a new user communication service token for the internal user, the request comprising a user communication service user identifier, an application token, and a tenant identifier;

in response to receiving the request for the new user communication service token, obtain the new user communication service token for the internal user; and provide, to the application, the new user communication service token for the internal user.

9. A computer-implemented method, comprising:

in response to receiving an indication of a virtual meeting being launched by a guest, generating a guest lobby chat identity for the guest, wherein the virtual meeting has corresponding virtual meeting information;

in response to receiving an indication the guest joined a lobby of the virtual meeting:

obtaining a communication service chat identifier for a lobby chat corresponding to the virtual meeting information, the lobby chat providing two-way chat functionality between an internal user, who has an account with an organization associated with a virtual meeting application hosting the virtual meeting, and the guest while the guest is in the lobby, wherein the guest is a user who does not have an account with the organization associated with the virtual meeting application, and wherein the two-way chat is conducted without having to admit the guest into the virtual meeting; and adding the guest to a chat roster for the lobby chat using the guest lobby chat identity for the guest and the communication service chat identifier;

receiving, from the virtual meeting application of the internal user, a request to join the lobby chat with the guest associated with the virtual meeting information, the request to join the lobby chat comprising a lobby chat identity for the internal user; and in response to receiving the request by the internal user to join the lobby chat, adding the internal user to the lobby chat with the guest by:

obtaining the communication service chat identifier for the lobby chat corresponding to the virtual meeting information;

adding the internal user to the chat roster for the lobby chat using the lobby chat identity for the internal user and the communication service chat identifier; and providing the communication service chat identifier to the application; and in response to receiving an indication the guest has been admitted to the virtual meeting, adding the guest to a virtual meeting chat roster of a virtual meeting chat, the virtual meeting chat and the lobby chat being two distinct chats.

10. The computer-implemented method of claim 9, wherein obtaining the communication service chat identifier for the lobby chat corresponding to the virtual meeting information comprises:

in response to determining the lobby chat has been created, retrieving, from a data resource storing mappings between communication service chat identifiers and virtual meeting information for a plurality of virtual meetings, the communication service chat identifier using the virtual meeting information.

11. The computer-implemented method of claim 9, wherein obtaining the communication service chat identifier for the lobby chat corresponding to the virtual meeting information comprises:

in response to determining the lobby chat has not been created:

creating the communication service chat identifier for the lobby chat; and storing the communication service chat identifier for the lobby chat linked to the virtual meeting information in a data resource storing mappings between communication service chat identifiers and virtual meeting information for a plurality of virtual meetings.

12. The computer-implemented method of claim 9, further comprising:

receiving, from the application, a request for the lobby chat identity for the internal user, the request comprising an application user identifier for the internal user, an application token, and a tenant identifier;

in response to receiving the request for the lobby chat identity for the internal user, obtaining the lobby chat identity for the internal user by:

in response to determining a user communication service user identity has been linked to the application user identifier for the internal user, retrieving the lobby chat identity for the internal user; and in response to determining a user communication service user identity has not been linked to the application user identifier for the internal user:

creating the lobby chat identity for the internal user; and storing the lobby chat identity for the internal user linked to the application user identifier and the tenant identifier; and providing, to the application, the lobby chat identity for the internal user, wherein the lobby chat identity for the internal user comprises a user communication service token and a user communication service user identifier for the internal user.

13. The computer-implemented method of claim 9, wherein the guest lobby chat identity for the guest comprises a guest communication service token and a guest communication service user identifier for the guest, wherein the lobby chat identity for the internal user comprises a user communication service token and a user communication service user identifier for the internal user, wherein the method further comprises:

communicating, to a communication service, a guest lobby chat message comprising the guest communication service token, the guest communication service user identifier for the guest, and the communication service chat identifier; and receiving, from the communication service, a user lobby chat message comprising the user communication service user identifier for the internal user and the communication service chat identifier.

14. The computer-implemented method of claim 9, wherein the virtual meeting comprises a virtual meeting chat, the virtual meeting chat and the lobby chat being two distinct chats.

15. A non-transitory computer-readable storage medium having instructions stored thereon that, when executed by a processing system, perform a method comprising:

in response to receiving an indication of a virtual meeting being launched by a guest, generating a guest lobby chat identity for the guest, wherein the virtual meeting has corresponding virtual meeting information;

in response to receiving an indication the guest joined a lobby of the virtual meeting:

obtaining a communication service chat identifier for a lobby chat corresponding to the virtual meeting information, the lobby chat providing two-way chat functionality between an internal user, who has an account with an organization associated with a virtual meeting application hosting the virtual meeting, and the guest while the guest is in the lobby, wherein the guest is a user who does not have an account with the organization associated with the virtual meeting application, and wherein the two-way chat is conducted without having to admit the guest into the virtual meeting; and adding the guest to a chat roster for the lobby chat using the guest lobby chat identity for the guest and the communication service chat identifier;

receiving, from the virtual meeting application of the internal user, a request to join the lobby chat with the guest associated with the virtual meeting information, the request to join the lobby chat comprising a lobby chat identity for the internal user; and in response to receiving the request by the internal user to join the lobby chat, adding the internal user to the lobby chat with the guest by:

obtaining the communication service chat identifier for the lobby chat corresponding to the virtual meeting information;

adding the internal user to the chat roster for the lobby chat using the lobby chat identity for the internal user and the communication service chat identifier; and providing the communication service chat identifier to the application; and in response to receiving an indication the guest has been admitted to the virtual meeting, adding the guest to a virtual meeting chat roster of a virtual meeting chat, the virtual meeting chat and the lobby chat being two distinct chats.

16. The computer-readable storage medium of claim 15, wherein obtaining the communication service chat identifier for the lobby chat corresponding to the virtual meeting information comprises:

in response to determining the lobby chat has been created, retrieving, from a data resource storing mappings between communication service chat identifiers and virtual meeting information for a plurality of virtual meetings, the communication service chat identifier using the virtual meeting information; and in response to determining the lobby chat has not been created:

creating the communication service chat identifier for the lobby chat; and storing the communication service chat identifier for the lobby chat linked to the virtual meeting information in the data resource storing mappings between the communication service chat identifiers and the virtual meeting information for the plurality of virtual meetings.

17. The computer-readable storage medium of claim 15, wherein the method further comprises:

receiving, from the application, a request for the lobby chat identity for the internal user comprising an application user identifier for the internal user, an application token, and a tenant identifier;

in response to receiving the request for the lobby chat identity for the internal user, obtaining the lobby chat identity for the internal user by:

in response to determining a user communication service user identity has been linked to the application user identifier for the internal user, retrieving the lobby chat identity for the internal user; and in response to determining a user communication service user identity has not been linked to the application user identifier for the internal user:

creating the lobby chat identity for the internal user; and storing the lobby chat identity for the internal user linked to the application user identifier and the tenant identifier; and providing, to the application, the lobby chat identity for the internal user, wherein the lobby chat identity for the internal user comprises a user communication service token and a user communication service user identifier for the internal user.

18. The computer-readable storage medium of claim 15, wherein the guest lobby chat identity for the guest comprises a guest communication service token and a guest communication service user identifier for the guest, wherein the lobby chat identity for the internal user comprises a user communication service token and a user communication service user identifier for the internal user, wherein the method further comprises:

communicating, to a communication service, a guest lobby chat message comprising the guest communication service token, the guest communication service user identifier for the guest, and the communication service chat identifier; and receiving, from the communication service, a user lobby chat message comprising the user communication service user identifier for the internal user and the communication service chat identifier.

19. The computer-readable storage medium of claim 15, wherein the guest is an guest that is an external attendee of the virtual meeting.

20. The system of claim 1, wherein the lobby chat identity for the internal user is a separate identity from an application identity of the internal user for the virtual meeting conducted with the virtual meeting application.

* * * * *